No. 757,483. PATENTED APR. 19, 1904.
J. C. McCLENAHAN.
PROCESS OF MANUFACTURING STONE.
APPLICATION FILED MAY 23, 1903.
NO MODEL.
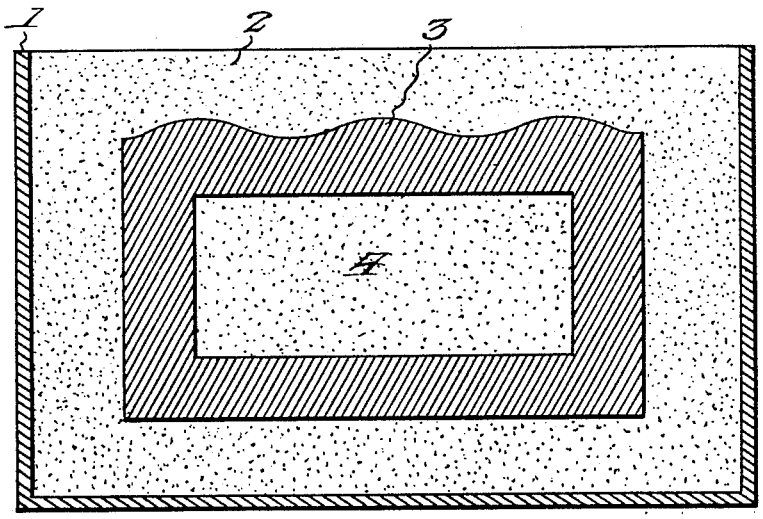
Witnesses
Edwin G. McKee
Chas. S. Hoyer
Inventor
Jacob C. McClenahan
By Victor J. Evans
Attorney No. 757,483. Patented April 19, 1904.

UNITED STATES PATENT OFFICE.

JACOB C. McCLENAHAN, OF WILMINGTON, DELAWARE.

PROCESS OF MANUFACTURING STONE.

SPECIFICATION forming part of Letters Patent No. 757,483, dated April 19, 1904.

Application filed May 23, 1903. Serial No. 158,479. (No specimens.)

*To all whom it may concern:*

Be it known that I, JACOB C. MCCLENAHAN, a citizen of the United States, residing at Wilmington, in the county of Newcastle and State of Delaware, have invented new and useful Improvements in Processes of Manufacturing Stone, of which the following is a specification.

This invention relates to a process of manufacturing stone, and has for its object the prevention of checking of the stone, the exudation of alkaline salts or other deleterious elements to the surface, and the enforcement of perfect chemical action of the constituents of the stone composition during the hydrosilicatization of the cement used in the manufacture of the stone, so that the finished product may possess superior qualities as to appearance, strength, texture, and durability.
Another important object and advantage of this invention is the facility with which all kinds and varieties of carved and ornamental work—such as capitals, columns, moldings, statuary, reliefs, and other contours and devices—can be produced and also perfect induration of the stone composition.

The porosity of the ordinary artificial stone induces the absorption of moisture, the presence of which dissolves the soluble constituents remaining in the stone, such as uncombined lime and clay and alkaline salts, which are carried to the surface and eventually appear as stains, defacing the stone and preventing its selection for ornamentation or building purposes. It is therefore necessary to decompose or neutralize these basic salts to render an artificial stone or other stone desirable for practical use. Various methods have been employed heretofore to accomplish this result, all of which have been more or less inefficient, cumbersome, and expensive. I have found by continued experiment that the simplest, most perfect, and inexpensive way to reach and neutralize these basic salts or uncombined elements and to harden the stone in the most efficient and perfect manner is through the medium of a chemically treated and saturated mold, and by using any porous material for the mold, such as a fine clean glass sand or pulverized stone, and thoroughly saturating the same with a chemical solution composed of sulfuric acid and alum the desired result is attained. It is well known to the art that a stone composition deprived of a sufficient amount of water or other liquid for the proper induration or crystallization of the silicates produces a very imperfect product. On the other hand, it is a well-established fact that in order for a stone to attain its highest efficiency some liquid agency must be supplied to the stone composition during the hydrosilicatization of the cement called "setting," and this, too, at the critical moment and while the chemical changes are taking place and the stone composition is in condition to receive the beneficial effects of the liquid. As far as known no means has ever been heretofore discovered that will accomplish this purpose and that could be practically applied at the proper time. Various methods have been resorted to, such as dipping the hardened or nearly-cured stone in solutions of different kinds or sprinkling the stone with a specially-prepared liquid, and furnace-heating has also been resorted to to arrive at the result sought; but the pursuit of these methods was too late to bring about any perceptible change in the stone, because petrifaction had already gone too far.

In order that the present process or method may be fully understood, it will be described with reference to the accompanying drawing, which shows a vertical section of a mold in which the improved process or method may be carried out.

The numeral 1 designates a flask or mold; 2, the molding material; 3, the stone composition, and 4 the core utilized when a hollow product is desired.

In the practice of the improved process or method the important steps are, first, the selection of the material constituting the stone composition; second, the proper mixing and tempering of the said materials previous to molding; third, the selection and preparation of the molding material which must be such as to enable sufficient storage of the chemical solution hereinbefore set forth for the perfect induration of the articles manufactured, and, lastly, the pouring of the stone composition into the mold. The proper preparation and careful saturation of the molding material, the application of the water to the stone composition, and the thorough mixing and tempering of the same are very essential elements in practice to obtain a perfectly successful result.

In preparing the mold the pattern which is to be produced in stone is placed within the box or flask 1 and the molding material saturated with a chemical solution and carefully tamped around the pattern until the molding material is sufficiently compact to hold its form when the pattern is withdrawn. The quality, texture, and other characteristics of the stone desired to be produced are determined by the kind and relative proportions of the ingredients composing the stone composition. For a fine quality of stone two pounds of Portland cement to five pounds of finely-crushed quartz or limestone or good clean sharp sand are used; but these proportions may be varied as necessity may require. Having determined upon the relative proportions of the material constituting the stone compound, the composition is mixed thoroughly dry, and thereto is added clean water in a light spray sufficient to produce what might be termed "reasonably thin" mortar. This is thoroughly "worked" in its plastic condition, so that every particle or atom of the sand or crushed quartz or limestone is surrounded or enveloped, as it were, with the molecules of the cement. More water is then gradually added to an extent sufficient to make a thin liquid and thoroughly worked or agitated, so that the air will be forced out of the composition and leave a homogeneous mass of thin material. This material is then poured into the mold prepared for the reception of the same. The tendency of this thin material is to penetrate every portion of the space in the mold and produce a stone with a very smooth even surface of a solid and compact nature and free from air-bubbles and other defects usually seen in stone formed from a stone composition in a stiff, plastic, or semiliquid state and run or forced into the mold. The stone material now being in position within the chemically-saturated mold, the absorbent qualities of the hardening cement take up the chemical solution by inward suction or capillary attraction, carrying with it the sulfuric acid, which decomposes or neutralizes the basic salts and prevents their exudation to the surface, the alum in the chemical solution removing any alkali present. The alkali decomposes the alum and produces alumina, which increases the hardness of the stone and fills the pores thereof.

In preparing the stone compound according to the improved process there seems to be created a very close affinity between the molecules of the material composing the compound. It maintains its form when poured into the mold and does not contract or expand after the initial set has taken place, the latter being a defect which has been found difficult to overcome in methods heretofore practiced. After remaining in the chemically-saturated mold for the necessary period the decomposing and hardening solution has thoroughly penetrated every part of the stone and almost complete crystallization or petrifaction has taken place. The pores are effectually closed, and after a few days' exposure in the open air the stone is ready for use. The period of time required for the stone to remain in the chemically-saturated mold is not of a fixed or arbitrary character, but depends upon the surrounding temperature and the condition of the stone composition and its capacity to utilize all the advantages of the several steps of the improved process or method.

The foregoing method is fully disclosed in my Patent No. 711,436, and the improvement consists in the additional steps of resaturating the mold as soon after the stone composition has been poured therein as is practical and as often thereafter as may be necessary and until complete crystallization has been effected. The constant inclination of cement or cement composition, as before indicated, is to absorb moisture, and while this constant and inherent suction or capillarity is going on the newly formed and forming stone must receive such treatment as will tend to induce its highest possible efficiency. It has also been found by experiment that a counter action or suppression of this suction or capillarity or tendency of cement or cement compound to absorb moisture greatly increases the value of the finished product, and the resaturation steps are pursued until the molecules of the composition have become petrified or crystallized, when the molded stone is removed from the mold and exposed to the open air, as before set forth.

In molding stone of large size the exposed face or faces of the block may be of fine material, such as described in the foregoing process, and backed up with coarser and "poorer" material—say one pound of cement to five or six pounds of sand, gravel, or crushed stone, as the case may be. In molding blocks of large size it has been found desirable to make them hollow, and this can be very readily done by the use of a porous core saturated with the chemical solution herein-before set forth, and where practicable it is desirable to do this, as it lightens and cheapens the cost of manufacture of the stone without sacrificing either it strength or durability.

Having thus fully described the invention, what is claimed as new is—

1. The herein-described process of making stone which consists in saturating a molding material with a chemical solution, pouring a liquid stone composition into the saturated molding material, afterward resaturating the molding material with a chemical solution, and allowing the mass to harden by absorption.

2. The herein-described process of making stone which consists in saturating a porous molding material with a hardening solution, pouring a liquid stone composition into the saturated molding material, subsequently resaturating the molding material with a similar hardening solution, and allowing the mass to set while absorbing the hardening solution.

3. The herein-described process of making stone which consists in saturating a porous molding material, pouring a liquid stone composition into the said molding material, and applying successive quantities of the hardening solution to the molding material after the stone composition is in the latter.

4. The herein-described process of making stone which consists in saturating a silicious molding material with a hardening chemical solution, pouring a liquid stone composition onto the saturated molding material and subsequently resaturating said molding material with a similar solution.

5. The herein-described process of making stone which consists in pouring a liquid stone composition in or on a chemically-saturated molding material, and a chemically-saturated core material, and subsequently resaturating the porous molding material and core material, and allowing the mass to set while absorbing the chemical solution.

In testimony whereof I affix my signature.

JACOB C. McCLENAHAN.

In presence of—
JOHN L. FLETCHER,
WILFRED E. LAWSON.